April 23, 1935.  E. R. FELLOWS  1,998,835
MACHINE FOR SHAPING HERRINGBONE GEARS
Filed July 18, 1930   5 Sheets-Sheet 4

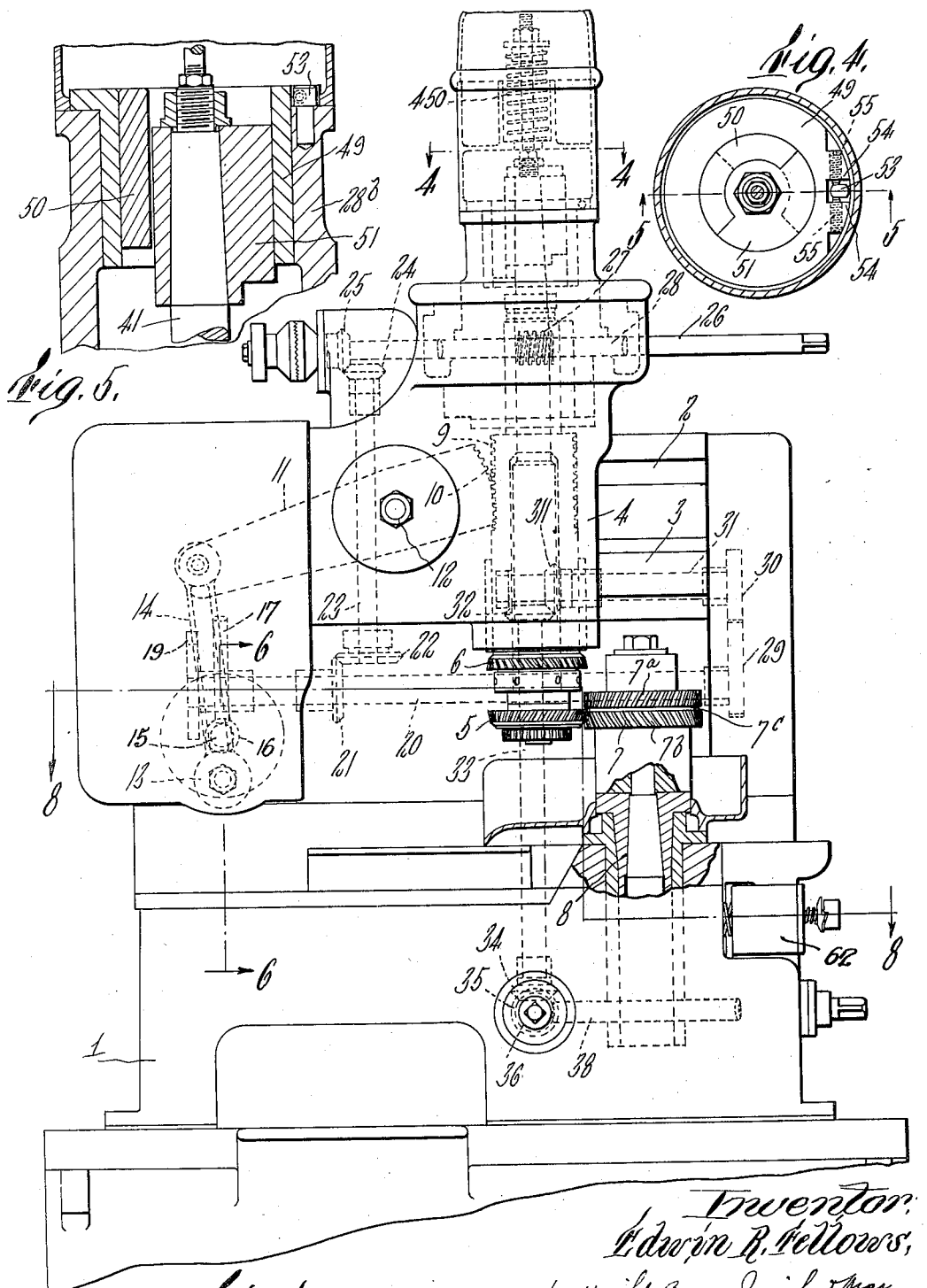

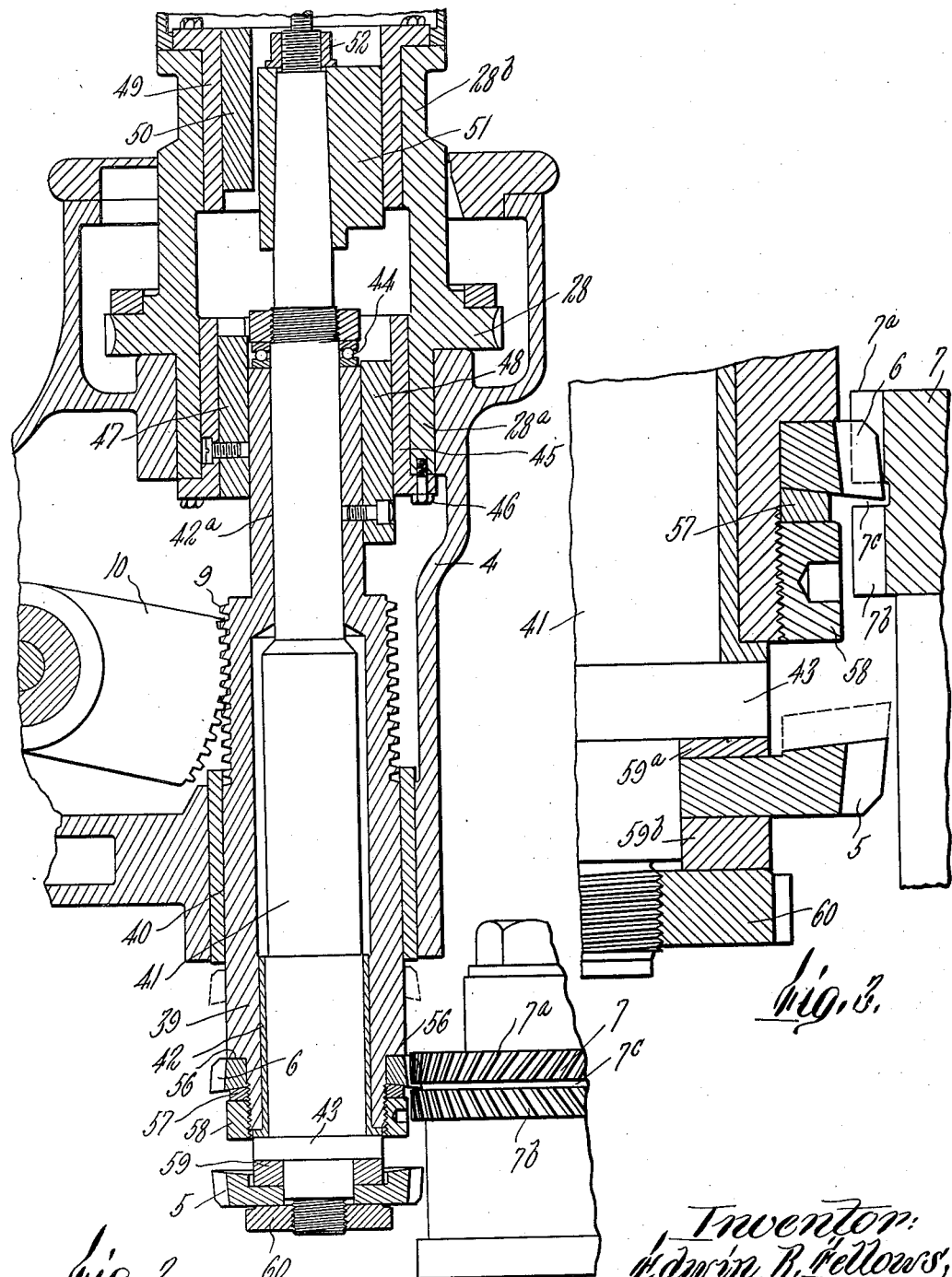

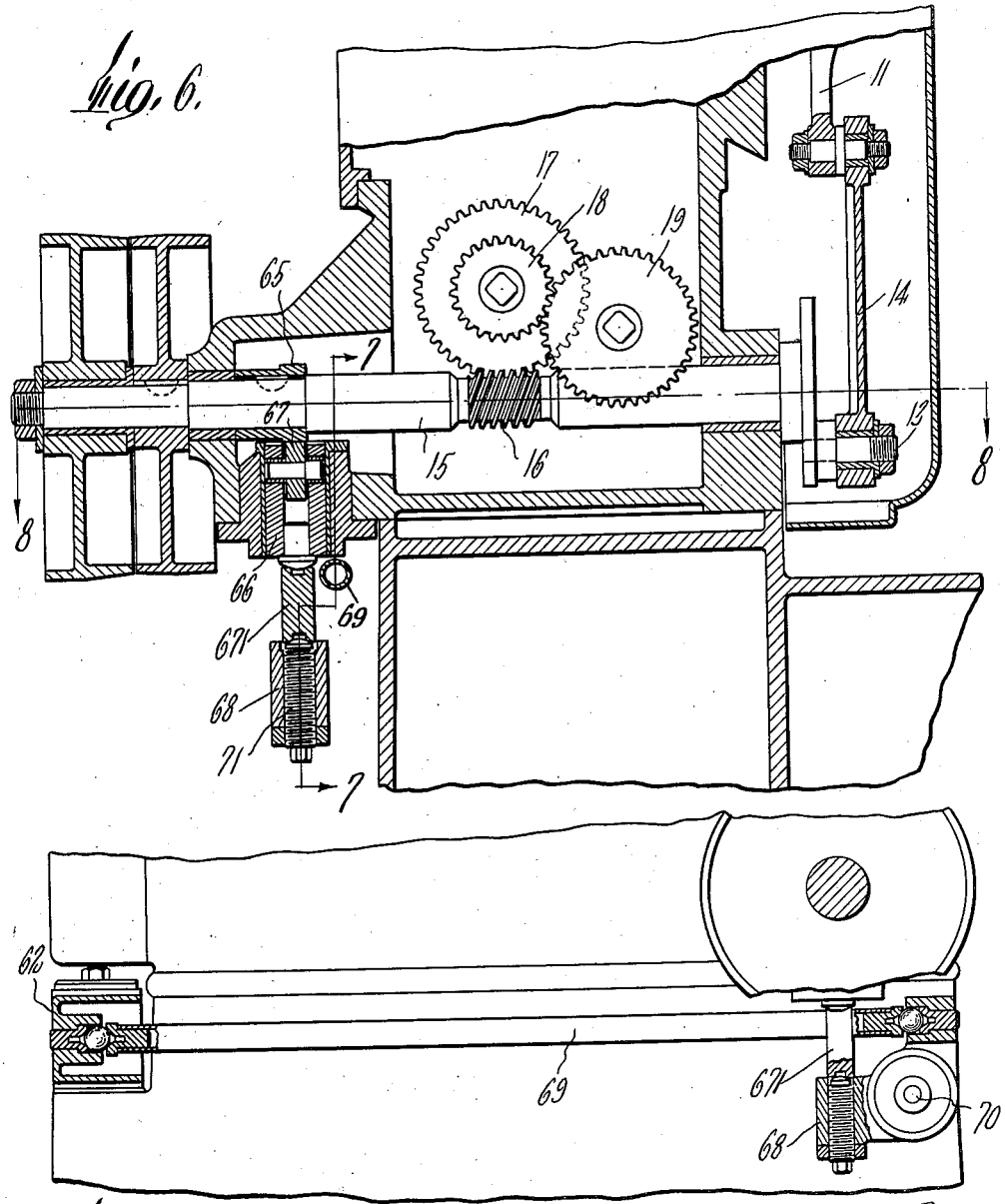

Inventor:
Edwin R. Fellows,
by Wright, Brown, Quinby & May
Attys

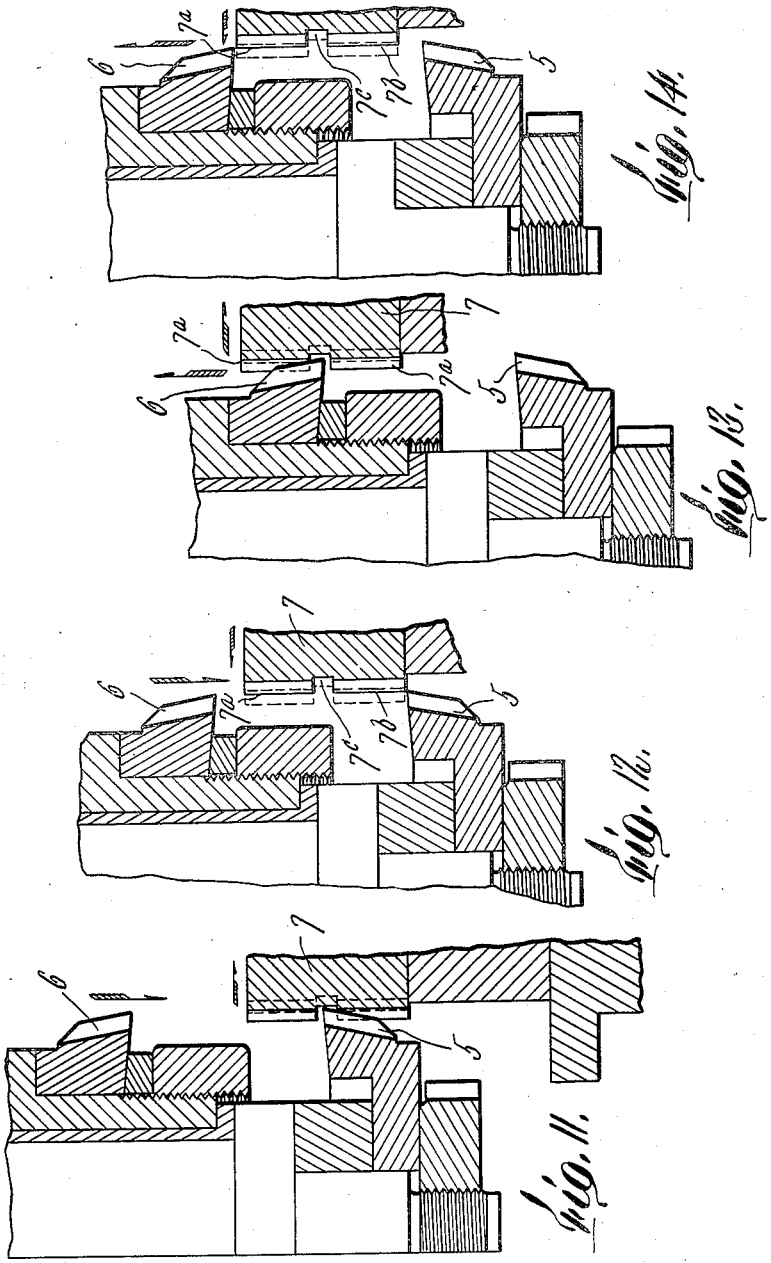
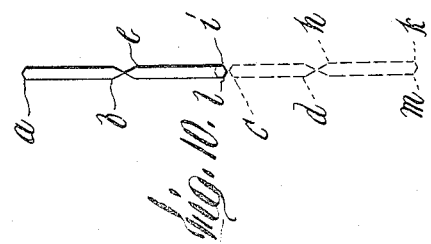

Patented Apr. 23, 1935

1,998,835

UNITED STATES PATENT OFFICE 1,998,835

MACHINE FOR SHAPING HERRINGBONE GEARS

Edwin R. Fellows, Springfield, Vt., assignor to The Fellows Gear Shaper Company, Springfield, Vt., a corporation of Vermont Application July 18, 1930, Serial No. 468,783

25 Claims. (Cl. 90—9)

The present invention relates to gear generating machines of the shaper type and its object is to provide a machine of this character adapted to produce herringbone gears in a continuous cycle of operations. Heretofore when gear generating machines of the character disclosed in my prior patents have been applied to the purpose of cutting herringbone gears, they have done the work in two steps or cycles. It was necessary either to cut teeth in the two halves of the work by two machines, one organized to cut helical teeth of right hand pitch and the other to cut left hand helical teeth, or else to change over the machine by substitution of a cutter and guides of opposite helical inclination to cut a second series of teeth in half the width of the blank after the first series of teeth had been completed in the other half of the blank. As compared with the prior art thus evidenced, my present object and accomplishment is to provide one machine with two helical cutters of opposite inclination and operate them to cut right hand helical teeth between one end and the middle of the blank, and left hand teeth between the middle and other end of the blank with substantially equal and simultaneous progress in both halves, so that the teeth of both series are completed together and at the end of a single cycle.

I am aware that other machines have been designed wherein two shaping cutters are used and are operated in a cycle of this character, and as to such machine my object is to produce a simpler and more rigid machine wherein the opportunity for objectionable looseness and play of the work spindle is reduced to the minimum. In carrying these objects into effect, I have produced a machine which is based on the design of my prior patents, for example, U. S. Letters Patent No. 1,478,472, December 25, 1923, but contains structural modifications and new features suited to the new object and effect accomplished. Among the more important of these new features are the provision of two coaxial spindles for the two cutters, combined with separate means for oscillating them oppositely to one another and a single means for giving them both a continuous generating rotation, and means for backing off or withdrawing the work while each cutter makes its non-cutting return stroke, and returning the work to operative position in time for the cutting action of each cutter. Further objects and characteristics of the invention appear from the following description of one embodiment thereof in connection with the drawings.

In the drawings,—

Fig. 1 is a front elevation of a gear shaping machine constructed in accordance with the invention for the purposes indicated;

Fig. 2 is a sectional view on a larger scale taken through the common axis of the cutter spindles, showing the means for reciprocating, rotating and oscillating the spindles;

Fig. 3 is a fragmentary sectional view of the cutters and work piece and the cutter spindles, showing the provisions for securing and adjusting the cutters;

Fig. 4 is a detail cross section taken on line 4—4 of Fig. 1;

Fig. 5 is an axial section taken on line 5—5 of Fig. 4;

Fig. 6 is a vertical section taken on line 6—6 of Fig. 1;

Fig. 7 is a vertical section taken on line 7—7 of Fig. 6;

Fig. 10 is a diagram illustrating the combined movements of the cutters and work piece;

Figs. 11, 12, 13 and 14 are fragmentary sectional views of the cutters and work piece showing some of the different positions of these members, relatively to one another.

Like reference characters designate the same parts wherever they occur in all the figures.

Figure 8:
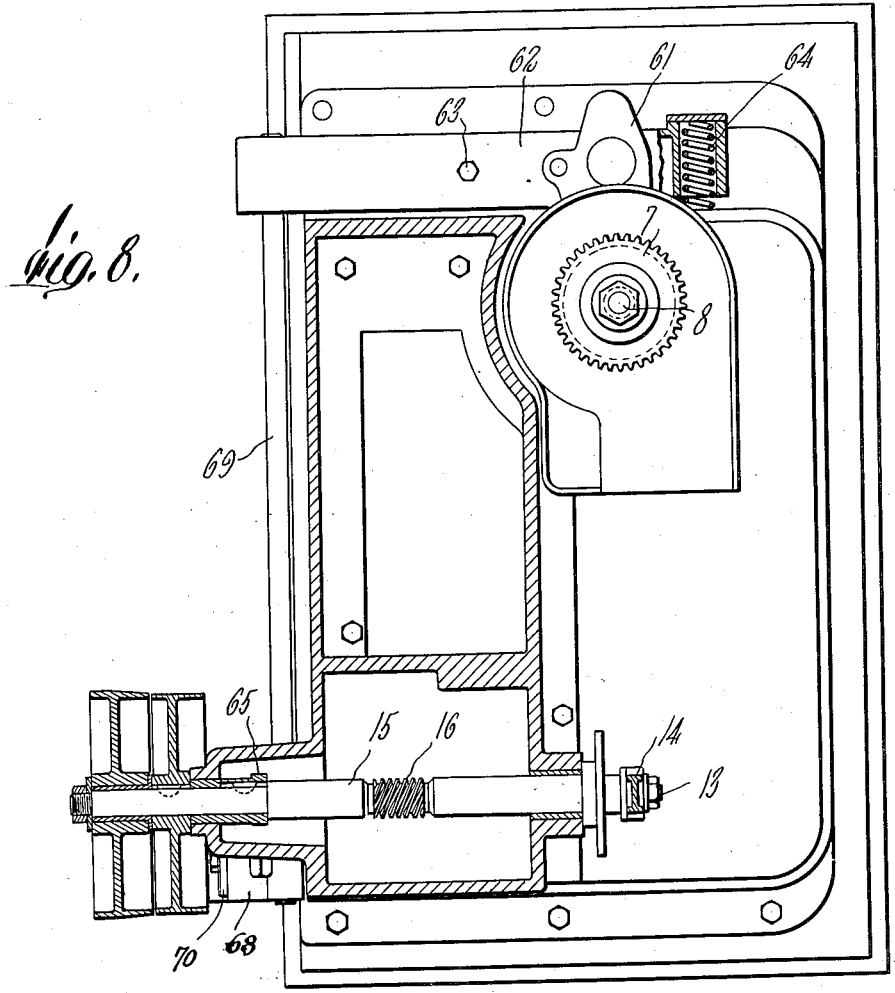
Fig. 8 is a horizontal section taken on line 8—8 of Figs. 1 and 6.

The machine as a whole comprises a base 1 having guideways 2, 3 on which a cutter carriage or saddle 4 is mounted for horizontal movement to provide the depth feed of the cutters 5 and 6 into the work piece 7 mounted on a spindle 8. The cutters are mounted on spindles which are reciprocated axially by rack and segment gearing 9, 10, the gear segment element of which is carried by an arm 11 mounted on a pivot 12 and oscillated by a crank 13 and connecting rod 14. The work and cutter spindles are rotated progressively at the same peripheral speed by gearing driven from the crank shaft 15 and comprising a worm 16, worm gear 17, gear train 18, 19, (Fig. 6) and shaft 20. Rotation is transmitted from shaft 20 to the cutter spindles through bevel gears 21, 22, shaft 23, bevel gears 24, 25, shaft 26, worm 27 and worm wheel 28, the latter being called for identification an index wheel. Shaft 20 drives the work spindle through gear train 29, 30, shaft 31, bevel gears 311, 32, shaft 33, bevel gears 34, 35, worm 36, and worm wheel 38 secured to the work spindle 8, all shown by dotted lines in Fig. 1. The mechanism thus far described and means for feeding the cutters to depth into the work constitute nothing new with the present invention, but are made here in accordance with standard commercial practice, the principles of which are illustrated in my prior patents, including the one hereinbefore specified. Description in further detail herein of the standard gear shaper structure is unnecessary to an explanation of the new steps in which the present invention consists.

These new steps comprise means for reciprocating two cutters in unison and appropriately oscillating them so that one will cut helical teeth of right hand helical inclination, for instance, in an encircling zone 7a occupying substantiallly half the face width of the work piece; and left hand, for instance, helical teeth in the zone 7b comprising approximately the other half of the work piece. The zones containing the teeth of opposite inclinations are separated by a groove 7c of sufficient width and depth to permit each cutter to clear out fully the spaces between the teeth which it generates, without striking the teeth generated by the other cutter. The cutters used for the purpose are standard helical gear shaper cutters each of corresponding helix angle, but opposite helical slant, and conjugate tooth form, to the teeth requiring to be produced in that half of the work piece on which it acts. Such cutters are reciprocated to act alternately on the work in their respective zones, to rotate progressively at a peripheral speed equal to that of the work, and to oscillate incrementally in the course of their travel so that their teeth travel in helical paths which are prolongations of the partial helices constituted by the teeth themselves.

The cutter 6 is mounted on a tubular spindle 39 which has a rotative and sliding bearing in a sleeve 40 in the lower part of saddle 4, and on the outside of which encircling ribs of rack tooth profile are formed to make the rack element of the rack and pinion gearing previously described. The other cutter 5 is mouned on an inner spindle 41 which has a rotative bearing at or adjacent to its opposite ends in the tubular spindle 39 at 42 and 42a. It also has end thrust bearings 43 and 44, either or both of which may be ball or roller bearings, overlapping the opposite ends of the tubular spindle, through which axial movement is transmitted from one to the other.

The inner spindle is engaged at its upper end with a counterbalance spring 450, as shown by dotted lines in Fig. 1, the structure and function of which are well known and understood by those skilled in the art.

Both spindles have upper bearings in the hub of the spindle rotating worm wheel 28, whereby they are additionally guided in reciprocating, and such bearings include helical guides by which oscillative movement is imparted to the spindles as they reciprocate, and the continuous rotative movement of the worm wheel is transmitted to the spindles. Said guides are constructed and mounted as follows.

The worm wheel has a downward sleeve extension 28a, fitted to rotate in the cutter saddle, and an upward sleeve extension 28b. In the extension 28a a sleeve 45 is fitted and secured by bolts 46. Said sleeve 45 contains a guide member 47 and a gib member 48. These members are complemental parts of a sleeve having helical mating faces, of which the member 47 is secured to sleeve 45 and member 48 is secured to the tubular spindle 39. These guide members are substantially like those shown in my Patent No. 1,662,109 dated March 13, 1928, with helical surfaces arranged as shown in my earlier Patent No. 676,227 of June 11, 1901. These surfaces are of the same helical lead and hand as the teeth of the cutter 6. The guide members 47 and 48 are so mounted in the sleeve 45 in order that the whole assemblage may be removed and replaced as a unit and supplanted by other similar units having a different helix angle.

The upper extension 28b of the worm wheel hub contains a sleeve 49 similar to sleeve 45, to which is secured a guide member 50 cooperating with a gib member 51 which is fitted to a tapered part of the spindle 41 and secured by a nut 52, these last named guides being substantially like those shown in said Patent No. 676,227 and forming a unit assemblage with sleeve 49. The guides 50 and 51 have the same helical lead and hand as the teeth of cutter 5.

The assemblage of the guides with a containing sleeve detachably applicable to the driving gear wheel is a novel feature of this invention. Another novel feature is the adjusting means about to be described, by which the spindle 41 may be rotated with a fine adjustment to bring the teeth of one cutter into the exact angular relationship to those of the other required by the gear to be cut.

For independently adjusting the cutter spindle 41 angularly, a stud 53 is fixed in the end of the wheel hub extension 28b, as shown in Figs. 4 and 5, extending into the space between two shoulders 54 on the overlapping flange of sleeve 49. The head of stud 53 is narrower than the space between shoulders 54, and serves as an abutment against which bear the ends of two adjusting screws 55 which are threaded through the shoulders 54 on respectively opposite sides of the abutment. It will be obvious that by retracting either screw and driving the other forward the guiding assemblage for spindle 41 may be moved angularly, after the cutters have been placed as nearly correctly as possible and clamped on their respective spindles, through the small angle needed to bring them into exactly correct relationship.

The cutters are placed on their respective spindles with an axial spacing between them of slightly greater width than the face width (in other words, the axial length) of the work piece. So wide a spacing is provided in order to give opportunity for backing off of the work during the non-cutting strokes of each cutter and for placement of the work in operative position during each cutting stroke of each cutter, as will be presently explained. Having regard to this requirement, such space is preferably made with the least possible excess width over the face width of the work piece.

The required space is obtained by design of the spindles in the first instance and by the use of filling rings and washers of various widths as needed. The spindle 39 is provided with a shoulder 56 at a distance back from its lower end sufficient to accommodate the cutter 6, a spacing ring or washer 57 and a clamping nut 58. Its extremity, of less diameter than the shoulder, is threaded to receive this nut. The other spindle has an extension beyond the thrust collar 43, of less diameter, to receive the cutter 5 and one or more spacing rings 59, and a threaded extension on which a clamp nut 60 is screwed. The under side of the thrust collar provides a shoulder against which the cutter 5 is clamped by the nut. As the cutters become thinner (axially shorter) by repeated sharpenings, they are adjusted toward one another by substitution of spacing rings of different thickness and transfer of spacing rings from one side to the other of the cutter. Fig. 3 shows illustratively how thinning of the cutter 5 from an original thickness represented by broken lines to that shown by full lines is compensated for by substitution of a thinner ring 59a between the cutter and the thrust collar, and placement of a ring 59b between the cutter and the nut 60. Similar readjustment may be made with respect to the cutter 6. In like manner adjustment of the cutters, within limits imposed by the original lengths of the spindles and location of their abutment shoulders 56 and 43, may be made to accommodate work pieces of different face widths. Further adjustment may be made by shifting the crank pin 13 along its crank arm and lengthening or shortening the connecting rod 14, according to principles well understood and illustrated in my Patent No. 1,478,472.

With the cutters and work piece thus in proper axial relationship, the cutter 6 acts on the down stroke of the spindles to cut through the zone 7a of the work piece and stop when it enters the encircling groove 7c. The cutter 5 meanwhile passes out of the zone 7b and withdraws therefrom. On the up stroke cutter 5 approaches the work while the cutter 6 crosses the zone 7a in withdrawing, and then the cutter 5 continuing its upward movement, enters zone 7b, performs a cutting action, and stops when it enters the groove 7b. This last position is illustrated in Fig. 11. While the cutters are at and near the end of their upward stroke, the work piece is slightly withdrawn far enough to clear the boundaries of the grooves cut therein from the edges of the cutter teeth while cutter 5 is traversing the zone 7b in its descent. When cutter 5 has passed out of the work and before cutter 6 has entered zone 7a, being then approximately in the position shown in Fig. 12, the work piece is advanced to operative position (shown by broken lines) and cutter 6 then traversing zone 7a performs a cutting action. When the cutters are at the bottom of their stroke, or approximately so, the work is again backed off, as shown in Fig. 13; and in the course of their up stroke, when approximately in the position shown in Fig. 14, the work is again returned to cutting position. The directions of movement of cutters and work are indicated by arrows and the different positions of the work piece (but with a large exaggeration of its actual displacement), by full and broken lines, in Figs. 11-14. The excess width between the cutters over the face width of the work piece, previously referred to, is provided to give time for the return of the work piece to cutting position while the cutters are traversing the distance between their positions shown in Figs. 12 and 14. At these times their speed of travel is a maximum due to the use of a crank as the means for driving them.

Figure 9:
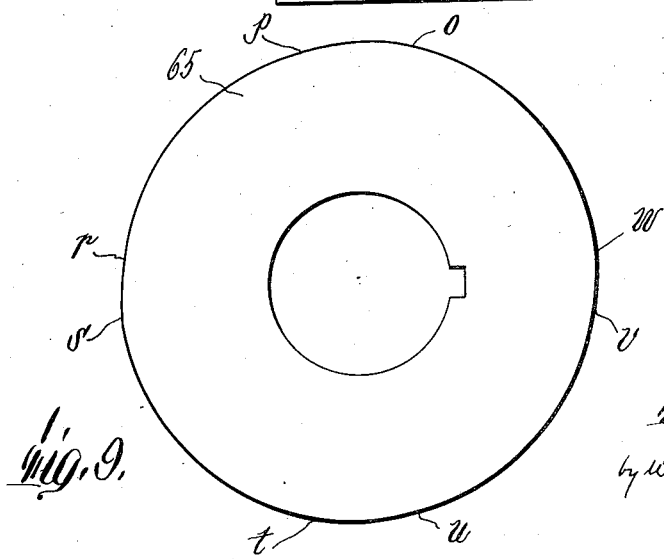
Fig. 9 is an elevation on a larger scale of the backing off cam by which the work is displaced to clear the cutters during their return strokes.

Fig. 10 is a diagram of the relative movements between the cutters and work piece, in which the vertical lines and vertical components of inclined lines represent the movements of the cutters, and the horizontal components of inclined lines represent the movements of the work piece. The full lines relate to cutter 6 and the broken lines to the movements of cutter 5. The locations and lengths of the inclined lines therein show approximately the times and duration of the movements of the work in relation to the strokes of the cutter. Thus the vertical lines a—b and c—d represent the travel of the cutters from the Fig. 11 position to that of Fig. 12 with the work backed off, the inclined lines b—e and d—h represent the displacement of the work back to operative position while the cutters continue in movement, and the lines e—i and h—k represent the continued movement of the cutters to the position of Fig. 13. The transverse lines i—l and k—m represent the backing off of the work back at the end of the stroke; and the remaining lines in the diagram represent the corresponding movements during the up stroke of their cutters and their pause at the upper end of this stroke. It may be observed in passing that the horizontal displacement shown in Figs. 10-14, and likewise the rises and descents of the cam for producing them, shown in Fig. 9, are here considerably exaggerated for clearness. Actually a very slight movement, too small to be shown plainly in a patent drawing, is sufficient to obtain the desired clearance.

The mechanism for thus backing off and returning the work is illustrated in Figs. 6-9. The work spindle holder, while resting on the machine bed, in a recess designed to hold it firmly and exactly in the position for cutting, is connected by a coupling 61 with a lever 62 which is connected by a pivot 63 with the bed and is acted on by a spring 64 which continuously tends to withdraw the work spindle from the cutter spindle, and is powerful enough to do so except when overcome by superior force. Such force is exerted by a cam 65 on the main shaft 15 which acts through a sliding plunger 66 (Fig. 6) carrying a roll 67 in engagement with the cam, a thrust rod 67I, bell crank lever 68, and thrust rod 69. The bell crank lever is pivoted to the machine base at 70 and has a horizontal arm projecting laterally beneath the end of thrust rod 67 and a vertical arm in a plane at one side thereof against which one end of thrust rod 69 engages. The other end of thrust rod 69 bears on the arm of lever 62 at the opposite side of the pivot thereof from the arm to which the work spindle is connected. Ball and socket joints are provided between the ends of the thrust rods and the members with which they engage to compensate for the angular movements of the lever arms. These joints are held in close engagement, without backlash, by the thrust of spring 64 and the resistance of cam 65. Thus it will be apparent that high points in the cam cause the spindle holder to be thrust against the seat in the machine base which establishes its relation to the cutter spindle axis, while receding and low parts of the cam permit the spring to withdraw the work. Provision for exact adjustment of this thrust mechanism or linkage, and to apply the work spindle holder with a desired pressure against its positioning seat is afforded by a screw 71 in the horizontal arm of bell crank 60 in approximate alinement with the thrust rod 67 and capable of being adjusted lengthwise thereof.

The cam has a descent from the point $o$ to the point $p$, a low dwell from $p$ to $r$, a rise from $r$ to $s$, a high dwell from $s$ to $t$, a descent from $t$ to $u$, a low dwell from $u$ to $v$, a rise from $v$ to $w$, and a high dwell from $w$ to $o$. Corresponding rises, descents and dwells are diametrically opposite to each other. The cam is keyed on the shaft 15 in such relation to the crank 13 that the descents o to p and t to u will pass the cam follower 66 while the crank is at its opposite dead points respectively, the low dwells p to r and u to v will pass the follower during approximately the first half of successive strokes, the rises r to s and v to w will pass the follower while the spindles are in approximately mid strokes, and the high dwells s to t and w to o will be in operation while the cutters are carrying out the operative parts of their respective strokes.

It will be understood that the relieving mechanism thus described in detail, while evidently suited to this particular machine, and preferable in some respects to other mechanisms which might be used, is by no means exclusive, but rather is typical of a variety of equivalent mechanisms applicable to the same purpose. The important fundamental fact of this phase of the invention is that means are furnished whereby the work is alternately moved back and forth during each stroke of the cutters, and that part of each stroke is performed while the work is withdrawn, and another part while the work is in cutting position.

This is a very valuable and useful feature of the invention, because it conduces to the greatest possible simplicity and rigidity of the machine. In precision machine tools, of which the gear shaper is an example, rigidity and the reduction to the minimum of clearances and lost motion between moving parts are essential to accuracy of results. The features here being discussed provide these essentials, for they cause the work spindle carrier to be held up against a rigid abutment while the cutting action is taking place and enable the cutter spindles to operate without lateral motion or looseness; at the same time providing the necessary clearance between the cutters and work during the return strokes of both cutters. An important related factor is the exactly coaxial arrangement of the cutter spindles and the fact that the inner spindle is fitted within the outer spindle. Thereby the outer spindle is enabled to serve as the carrier and bearing for the inner spindle, doing away with the outer bearing for the inner spindle beyond the cutters, which has been a feature of other machines designed for producing herringbone gears in one cycle.

The machine is adjustable by virtue of the characteristics hereinbefore described to produce gears varying through a considerable range in diameter, length, pitch and helix angle. By appropriately changing either or both of the pairs of guides 47, 48 and 50, 51, teeth may be cut in either half of the work with helix angles of any value between parallelism with the axis and the greatest obliquity to the axis capable of being produced by helical guides, and with either a right hand or left hand inclination.

What I claim and desire to secure by Letters Patent is:

1. A machine for cutting herringbone gears comprising two helical gear shaper cutters of relatively opposite helical tooth inclinations mounted coaxially with their cutting ends facing toward one another and with a separation between them wide enough to permit backing off movement or return movement of the work while clear of both cutters, means for reciprocating said cutters axially in unison, means for simultaneously oscillating the cutters in the directions of their tooth helices during each stroke, and means for withdrawing the work from the cutter axis at the end of each stroke and returning it to cutting position in the middle part of each stroke of the cutters.

2. A machine for generating and cutting herringbone gears comprising coaxial cutter spindles, one of which has rotative bearing within the other, and a work spindle parallel to one another, gear shaper cutters having helical teeth of relatively opposite helix angles mounted on the respective cutter spindles at a distance apart greater than the face width of the gear to be cut and with their cutting ends facing toward one another, rotation transmitting means connected to said spindles adapted to rotate the cutter spindles in one direction and the work spindle in the opposite direction at angular speeds which impart equal pitch line velocities to the cutter and work, means for giving incremental oscillative movements about their axes to the cutter spindles simultaneously and in relatively opposite directions, and means for effecting a relative reciprocatory movement between the cutter and work spindles.

3. A machine for generating and cutting herringbone gears, comprising means for mounting two gear shaper cutters of opposite helical inclinations in coaxial arrangement with their cutting ends turned toward one another and separated by a distance wider than the face of the gear to be cut, a work spindle arranged with its axis parallel to the cutter axis, means for giving relative movements of axial reciprocation, generative rotation and helical oscillation between the cutters and work piece, and means for backing off the work piece to clear the cutters at each end of the relative cutting reciprocation, and returning it to cutting position during that part of such reciprocation where the work piece is beside the space between the cutters.

4. In a gear generating machine of the character described, coaxial cutter spindles, a single machine element for rotating said spindles, and separate rotation transmitting means between said gear element and the several spindles, said means comprising cooperating guide members on the machine element and spindles respectively having helical mating surfaces of which those relating to one spindle are of right hand pitch and those relating to the other are of left hand pitch.

5. In a gear generating machine of the character described, coaxial cutter spindles, one of which is tubular and surrounds the other, and of which one end of the inner spindle protrudes beyond the adjacent end of the tubular spindle, guide members secured to the adjacent ends of the respective spindles having helical contact faces of relatively opposite hands, complemental guide members each coacting with one of the first named guide members and having a complemental helical contact face, and a single rotation transmitting wheel coaxial with the spindles to which both of the second named guide members are connected to be rotated thereby.

6. In a gear generating machine of the character described, coaxial inner and outer cutter spindles, means engaged with the outer spindle for transmitting reciprocating movement thereto, thrust bearings between the spindles for transmitting axial movement from the outer to the inner one, an index wheel and separate rotation transmitting means between said index wheel and each of the spindles, each of said transmission means comprising complemental guide members having helical contact faces, one of which members is connected to the index wheel and the other to the spindle, and the helical inclination of the guide members for one spindle being of the opposite hand to that of the other spindle.

7. In a herringbone gear shaping machine, the combination with a work spindle, two cutter spindles, cutters on the respective spindles and means for effecting relative reciprocation between the cutter spindles on the one hand and the work spindle on the other hand, of a cam and motion transmitting means between said cam and the work spindle operating in timed relation to said spindle reciprocating means, for moving the work spindle in opposite directions, respectively, into and out of cutting position, such movements in one direction being effected at each end of said reciprocating motions, and those in the opposite direction at an intermediate point in each reciprocating motion.

8. In a herringbone gear generating machine, the combination with relatively reciprocative cutter and work spindles, and cutters carried by said cutter spindles spaced apart from one another by a distance greater than the face width of the gear to be cut, of means including a crank for effecting relative reciprocative movements between said spindles, a cam rigidly connected with said crank, and means controlled by said cam for moving the work spindle into and out of cutting position; the cam having two rises and two descents for that purpose angularly related to the crank in such manner as to cause withdrawal of the work spindle at each end of each reciprocating movement, and return of the work spindle into cutting position at an intermediate point in the course of each reciprocating movement.

9. In a gear shaping machine as set forth in claim 8, the cam having two rises at opposite sides of its axis, two descents at relatively opposite sides of its axis and approximately quartering with the said rises, and alternate high and low dwells between adjacent rises and descents.

10. A herringbone gear shaping machine comprising a work spindle, a plurality of coaxially arranged helical gear shaper cutters adapted to cut teeth of opposite helical inclinations in adjacent zones of a gear blank, means for effecting relative cutting reciprocation between the cutters and work spindle lengthwise of the cutter axis, comprising a rotating crank, and means for backing off the work spindle transversely to the cutter axis comprising a cam movable in timed relation to the movements of said crank and having offsets arranged to cause backing off of the work spindle when the crank is in course of passing each of its dead points and to cause return of the work spindle when the crank is substantially in each mid position between dead points.

11. In a gear shaping machine, the combination with an endwise reciprocatable cutter spindle and a rotary machine element surrounding said spindle, of means for coupling said machine element and spindle together with provision for relative axial movement comprising a sleeve detachably secured to said machine element and complemental guide members respectively secured to said sleeve and the spindle.

12. In a gear shaping machine, the combination with an endwise reciprocatable cutter spindle and a rotary machine element surrounding said spindle, of means for coupling said machine element and spindle together with provision for relative axial movement comprising a sleeve detachably secured to said machine element and complemental guide members having mating helicoidal surfaces arranged coaxially of the spindle and being secured respectively to the sleeve and the spindle.

13. In a machine of the character described, the combination of two coaxial cutter spindles, one of which passes through and is fitted rotatably in the other, a supporting structure in which the outer spindle has a rotative and reciprocative bearing and by which it is withheld from lateral movement, means directly engaged with the outer spindle for imparting reciprocation thereto, and thrust bearings for transmitting reciprocation in both directions from the outer to the inner spindle.

14. In a machine of the character described, the combination of two coaxial cutter spindles, one of which passes through and is fitted rotatably in the other, a supporting structure in which the outer spindle has a rotative and reciprocative bearing and by which it is withheld from lateral movement, means directly engaged with the outer spindle for imparting reciprocation thereto, thrust bearings for transmitting reciprocation in both directions from the outer to the inner spindle, and means for transmitting rotation to said spindles, said rotation transmitting means being withheld by the supporting structure from lateral movement.

15. In a machine of the character described, coaxial spindles, one of which surrounds the other and both of which are mounted for rotative and reciprocative movement, means for imparting reciprocation directly to one of the spindles, means for transmitting end thrust directly from said spindle to the other spindle, a single rotation imparting machine element for both spindles, and guiding means separately interposed between said element and the respective spindles for transmitting rotation to the spindles and causing a twisting motion thereof by virtue of their reciprocations.

16. In a machine of the character described, coaxial spindles, one of which surrounds the other and both of which are mounted for rotative and reciprocative movement, means for imparting reciprocation directly to one of the spindles, means for transmitting end thrust directly from said spindle to the other spindle, a single rotation imparting machine element for both spindles, and guiding means separately interposed between said element and the respective spindles for transmitting rotation to the spindles and causing a twisting motion thereof by virtue of their reciprocations, each of said guiding means comprising a pair of complemental elements having helical mating surfaces.

17. In a gear shaping machine, two cutter spindles, one of which is fitted coaxially within the other, in a manner preventing lateral displacement relatively thereto.

18. In a gear shaping machine, two cutter spindles, one of which is fitted rotatably, but otherwise immovably, within the other, a bearing in which the outer spindle is fitted for reciprocative and rotative movement, and structural means preventing lateral movement of said bearing.

19. In a gear shaping machine, two cutter spindles coaxially arranged, and prevented from moving laterally with respect to one another, rack and segment gearing applied to one spindle for reciprocating it, and means for transmitting such reciprocation from said spindle to the other spindle.

20. In a gear shaping machine, two cutter spindles coaxially arranged and prevented from moving laterally with respect to one another, an oscillative operating arm having teeth meshing with complemental teeth on one of the spindles for reciprocating it, and means for transmitting such reciprocation from said spindle to the other spindle.

21. In a gear shaping machine, the combination of two coaxial cutter spindles, a common gear element for rotating both spindles simultaneously, and adjusting means between said gear element and one of the spindles for effecting angular displacement of said spindle relatively to the gear element.

22. In a gear shaping machine, two coaxial cutter spindles, one of which is fitted rotatably within the other, a single gear element for rotating both spindles, separate guide means between each spindle and said gear element for transmitting rotation from the latter to the spindles, and adjusting means for shifting one of said guide means angularly with respect to said gear element.

23. In a gear shaping machine, a reciprocative and rotative cutter spindle, a driving gear element surrounding said spindle, complemental guides connected respectively to said spindle and gear element for transmitting rotation from one to the other while permitting relative reciprocation, and means for angularly adjusting said complemental guides relatively to the gear element.

24. In a gear shaping machine, a rotatable driving gear element, a reciprocative cutter spindle coaxially arranged with respect to said gear element, guiding means coaxial with said spindle and gear element for transmitting rotation to the former from the latter while permitting relative reciprocation between them, and means for adjusting said guiding means angularly around the axis of the spindle with respect to the gear element.

25. In a gear shaping machine of the character described, a spindle-rotating machine element, a sleeve fitted coaxially within said machine element, adjusting means for turning said sleeve with respect to the machine element around their common axis, a cutter spindle coaxial with said sleeve and complemental guiding means connected respectively to said sleeve and to the spindle for transmitting rotation from the former to the latter while permitting relative axial movement between them.

EDWIN R. FELLOWS.